US010721973B1

(12) United States Patent
Hermiz

(10) Patent No.: US 10,721,973 B1
(45) Date of Patent: Jul. 28, 2020

(54) ELECTRONIC SMOKING DEVICE WITH AN INDICATOR ASSEMBLY FOR PROVIDING VISUAL OUTPUT BASED ON OPERATION OF PLURAL ATOMIZERS

(71) Applicant: Cegnum LLC, Farmington Hills, MI (US)

(72) Inventor: Randy Hermiz, Farmington Hills, MI (US)

(73) Assignee: Cegnum LLC, Farmington Hills, MI (US)

( * ) Notice: Subject to any disclaimer, the term of this patent is extended or adjusted under 35 U.S.C. 154(b) by 0 days.

(21) Appl. No.: 16/597,254

(22) Filed: Oct. 9, 2019

(51) Int. Cl.
| *A24F 13/00* | (2006.01) |
| *A24F 47/00* | (2020.01) |
| *G05B 15/02* | (2006.01) |
| *G08B 5/22* | (2006.01) |
| *H05B 3/06* | (2006.01) |
| *H02J 7/00* | (2006.01) |
| *G06F 3/023* | (2006.01) |

(52) U.S. Cl.
CPC ............ *A24F 47/008* (2013.01); *G05B 15/02* (2013.01); *G08B 5/22* (2013.01); *H05B 3/06* (2013.01); *G06F 3/023* (2013.01); *H02J 7/0044* (2013.01); *H05B 2203/021* (2013.01)

(58) Field of Classification Search
CPC ........................................................ A24F 47/00
USPC ................................................ 131/328–329
See application file for complete search history.

(56) References Cited

U.S. PATENT DOCUMENTS

| 5,095,921 | A | 3/1992 | Losee et al. |
| 6,598,607 | B2 | 7/2003 | Adiga et al. |
| 7,726,320 | B2 | 6/2010 | Robinson et al. |
| 8,490,628 | B2 | 7/2013 | Hon |
| 8,528,569 | B1 | 9/2013 | Newton |
| 8,678,012 | B2 | 3/2014 | Li et al. |

(Continued)

FOREIGN PATENT DOCUMENTS

| CN | 101606758 A | 12/2009 |
| EP | 2113178 A1 | 11/2009 |

(Continued)

OTHER PUBLICATIONS

Jukasavapor.com, Set-Up & How to Guide, Dual Tank Pro, pp. 1-2.

*Primary Examiner* — Phuong K Dinh
(74) *Attorney, Agent, or Firm* — Howard & Howard Attorneys PLLC

(57) ABSTRACT

An electronic smoking device. A cartridge includes first and second heating elements arranged in parallel to respectively provide first and second vapors through an opening of a mouthpiece. The cartridge is configured to be removably coupled with a capital assembly including a power source, a controller, an indicator assembly, and a user input. The indicator assembly is configured to provide a first, second, or third visual output based on one of a first, second, or third user input. The indicator assembly may include first and second indicator lights. The third visual output may include illumination of both the first and second indicator lights, which may be indicative of a blend of first and second flavors. The outputted light may be shaped as chevrons oriented sideways and facing towards opposing sides of the capital assembly. The user input may include a button for toggling the device between first, second, and third states.

15 Claims, 12 Drawing Sheets

(56) References Cited

U.S. PATENT DOCUMENTS

| | | |
|---|---|---|
| 8,707,965 B2 | 4/2014 | Newton |
| 8,733,345 B2 | 5/2014 | Siller |
| 8,833,364 B2 | 9/2014 | Buchberger |
| 9,072,321 B2 | 7/2015 | Liu |
| D744,419 S | 12/2015 | Bowen et al. |
| 9,215,895 B2 | 12/2015 | Bowen et al. |
| 9,271,528 B2 | 3/2016 | Liu |
| 9,380,810 B2 | 7/2016 | Rose et al. |
| 9,451,793 B2 | 9/2016 | Zhou |
| 9,596,887 B2 | 3/2017 | Newton |
| 9,730,472 B2 | 8/2017 | Farrow |
| 9,763,478 B2 | 9/2017 | Cameron et al. |
| 9,861,773 B2 | 1/2018 | Terry et al. |
| 10,004,265 B2 | 6/2018 | Yu et al. |
| 10,039,320 B2 | 8/2018 | Cameron et al. |
| 10,045,568 B2 | 8/2018 | Monsees et al. |
| 10,046,434 B2 | 8/2018 | Natsume et al. |
| 10,058,130 B2 | 8/2018 | Monsees et al. |
| 10,070,669 B2 | 9/2018 | Monsees et al. |
| 10,076,139 B2 | 9/2018 | Monsees et al. |
| 10,085,489 B2 | 10/2018 | Hon |
| 10,092,039 B2 | 10/2018 | Bless et al. |
| 10,104,914 B2 | 10/2018 | Force |
| 10,123,568 B1 | 11/2018 | Zhu |
| 10,159,278 B2 | 12/2018 | Minskoff et al. |
| 10,201,190 B2 | 2/2019 | Monsees et al. |
| 10,219,548 B2 | 3/2019 | Robinson et al. |
| 10,226,079 B2 | 3/2019 | Robinson et al. |
| 10,231,488 B2 | 3/2019 | Robinson et al. |
| 10,264,819 B2 | 4/2019 | Smith et al. |
| 10,264,824 B2 | 4/2019 | Weigensberg et al. |
| 10,285,451 B2 | 5/2019 | Bless et al. |
| 2009/0272379 A1 | 11/2009 | Thorens et al. |
| 2013/0180533 A1 | 7/2013 | Kim et al. |
| 2013/0192617 A1 | 8/2013 | Thompson |
| 2013/0192618 A1 | 8/2013 | Li et al. |
| 2013/0192623 A1 | 8/2013 | Tucker et al. |
| 2014/0014126 A1 | 1/2014 | Peleg et al. |
| 2014/0096781 A1 | 4/2014 | Sears et al. |
| 2014/0366898 A1 | 12/2014 | Monsees et al. |
| 2016/0106153 A1* | 4/2016 | Zhu .................. A24F 47/008 131/329 |
| 2016/0106936 A1 | 4/2016 | Kimmel |
| 2016/0338407 A1 | 11/2016 | Kerdemelidis |
| 2017/0354180 A1 | 12/2017 | Fornarelli |
| 2018/0168234 A1 | 6/2018 | Hon |
| 2018/0184719 A1 | 7/2018 | Hon |
| 2018/0192760 A1 | 7/2018 | Lee |
| 2018/0263290 A1 | 9/2018 | Collett et al. |
| 2019/0142069 A1* | 5/2019 | Qiu .................. A24F 47/008 131/329 |

FOREIGN PATENT DOCUMENTS

| | | |
|---|---|---|
| WO | 2018133000 A1 | 7/2018 |
| WO | 2018178628 A1 | 10/2018 |

* cited by examiner

ELECTRONIC SMOKING DEVICE WITH AN INDICATOR ASSEMBLY FOR PROVIDING VISUAL OUTPUT BASED ON OPERATION OF PLURAL ATOMIZERS

BACKGROUND

The electronic cigarette—often referred as an e-cigarette, electronic smoking device, or electronic vaping device—is a battery-powered device which simulates tobacco smoking. An atomizer may include a heating element that vaporizes a liquid solution (e-liquid) including, for example, nicotine, flavoring, or a combination thereof. The electronic smoking device may include a cartridge that contains the e-liquid, the heating element, and other components. The cartridge may be removably coupled to a base that houses several components of the electronic smoking device. The cartridge may be disposable, whereas the base may be reusable.

The electronic smoking device may include more than one atomizer to selectively vaporize one or more e-liquids, such that those disclosed in U.S. Pat. No. 9,271,528, issued Mar. 1, 2016, and U.S. Pat. No. 10,039,320, issued Aug. 7, 2018, the entire contents of each are hereby incorporated by reference. The '320 patent, for example, mentions a vapor blend recipe produced by vaporizing more than one flavored e-liquid. The devices lack an intuitive and efficient manner by which to select which one or more of the e-liquids to be vaporized, and/or to indicate to the user which one or more of the e-liquids is being vaporized during operation of the electronic smoking device.

Perhaps one appealing aspect of certain electronic smoking devices is the small form factor which may be easily stored and/or concealed. Providing an electronic smoking device including a cartridge for storing and selectively vaporizing more than one separately stored e-liquids in a space-conscious manner is a challenge not sufficiently addressed by known electronic smoking devices. Therefore, an electronic smoking device configured to overcome one or more of the aforementioned shortcomings is desired.

SUMMARY

An electronic smoking device including a cartridge and a capital assembly configured to be removably coupled to the cartridge. The cartridge includes a first atomizer comprising a first reservoir configured to store a first liquid vaporizable material, and a first heating element operable to vaporize the first liquid vaporizable material to provide a first vapor drawable through an opening of a mouthpiece. A second atomizer is arranged in a parallel configuration with the first atomizer. The second atomizer comprising a second reservoir configured to store a second liquid vaporizable material, and a second heating element operable to vaporize the second liquid vaporizable material a second vapor drawable through the opening of the mouthpiece. The capital assembly includes a controller, and a power source, a user input, and an indicator assembly in communication with the controller. The power source is configured to provide energy to activate at least one of the first and the second heating elements. The user input is configured to receive at a first user input to place the device in a first state, a second user input to place the device in a second state, and a third user input to place the device in a third state. The controller is configured to operate the power source and to activate the first heating element with operation of the device in the first state, activate the second heating element with operation of the device in the second state, and activate both the first and second heating elements with operation of the device in the third state. The controller is further configured to operate the indicator assembly to provide a first visual output in response to the user input receiving the first user input, a second visual output different than the first visual output in response to the user input receiving the second user input, and a third visual output different than the first and second visual outputs in response to the user input receiving the third user input.

An electronic smoking device including a cartridge and a capital assembly configured to be removably coupled to the cartridge. The cartridge includes a first atomizer comprising a first reservoir configured to store a first liquid vaporizable material, and a first heating element operable to vaporize the first liquid vaporizable material to provide a first vapor drawable through an opening of a mouthpiece. A second atomizer is arranged in a parallel configuration with the first atomizer. The second atomizer comprising a second reservoir configured to store a second liquid vaporizable material, and a second heating element operable to vaporize the second liquid vaporizable material a second vapor drawable through the opening of the mouthpiece. The capital assembly includes a controller, and a power source and an indicator assembly in communication with the controller. The power source is configured to provide energy to activate at least one of the first and the second heating elements when the capital assembly is removably coupled with the cartridge. The indicator assembly includes a first indicator light and a second indicator light. The controller is configured to illuminate the first indicator light with activation of the first heating element, illuminate the second indicator light with activation of the second heating element, and illuminate both the first and second lights with activation of both the first and second heating elements.

An electronic smoking device including a cartridge and a capital assembly configured to be removably coupled to the cartridge. The cartridge includes a first atomizer comprising a first reservoir configured to store a first liquid vaporizable material of a first flavor, and a first heating element operable to vaporize the first liquid vaporizable material. A second atomizer is arranged in a parallel configuration with the first atomizer. The second atomizer comprising a second reservoir configured to store a second liquid vaporizable material of a second flavor, and a second heating element operable to vaporize the second liquid vaporizable material. The capital assembly includes a controller, and a power source and an indicator assembly in communication with the controller. The power source is configured to provide energy to activate at least one of the first and the second heating elements when the capital assembly is removably coupled with the cartridge. The controller is further configured to operate the indicator assembly to provide a first visual output indicative vaporization of the first liquid vaporizable material such that vapor of the first flavor is drawable through the opening of the mouthpiece, provide a second visual output different than the first visual output indicative of vaporization of the second liquid vaporizable material such that the favor of the second flavor is drawable through the opening of the mouthpiece, and provide a third visual output different than the first and second visual outputs indicative of simultaneous vaporization of the first and second liquid vaporizable materials such that vapor of a blend of the first and second flavors is drawable through the opening of the mouthpiece.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1:
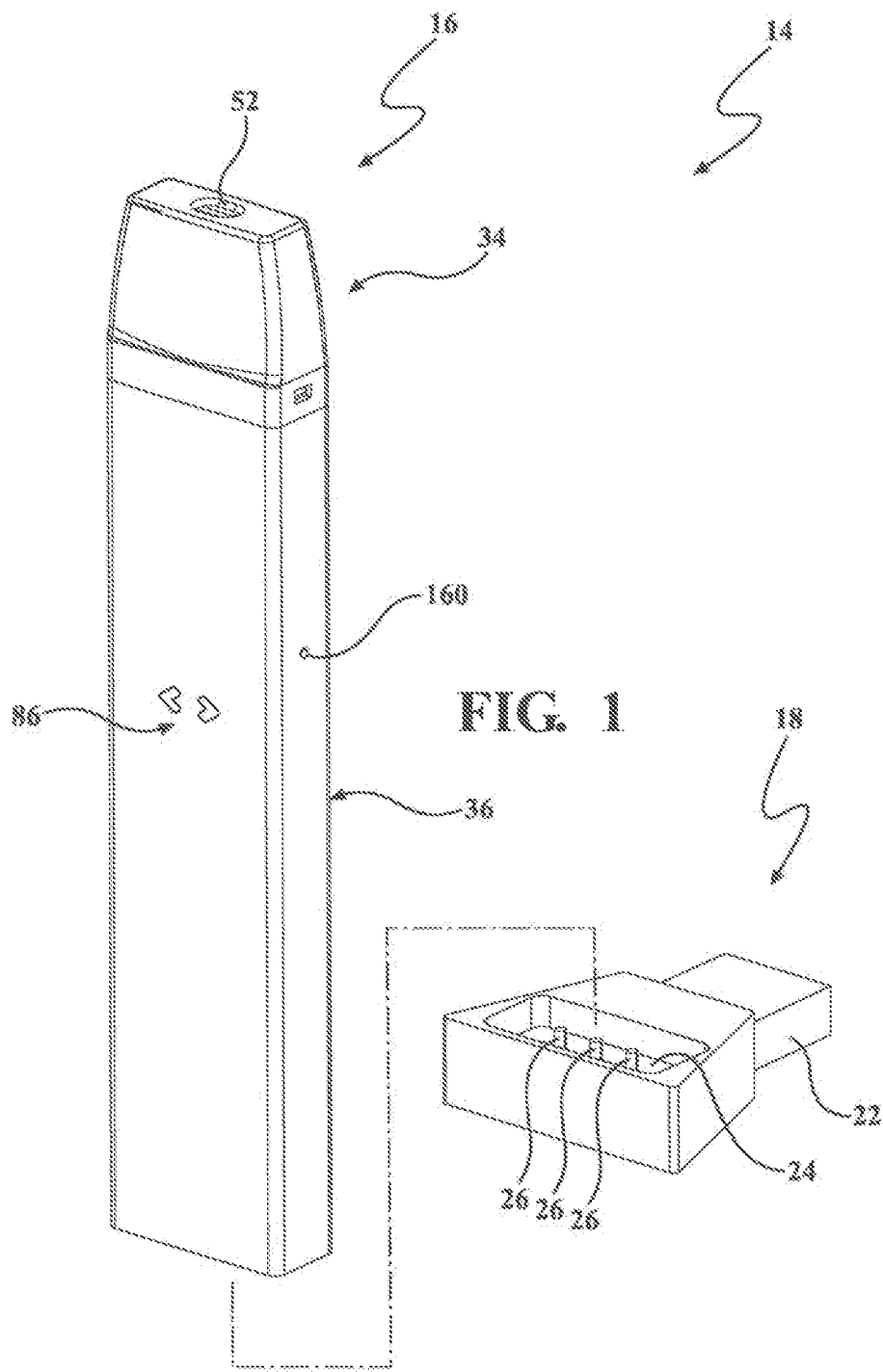
FIG. 1 is a perspective view of an electronic smoking system including an electronic smoking device and a base charger.

FIG. 1 shows an electronic smoking system 14 including an electronic smoking device 16 and a charger base 18. The electronic smoking device 16 is configured to be removably coupled to the charger base 18 as desired, for example, to replenish the energy stored within a power source 20 or battery (see FIGS. 4-6). More particularly, the charger base 18 may include a plug 22 configured to be removably coupled with a remote power source such as a wall outlet, personal device, or the like. The plug 22 shown in FIG. 1 is the male connector of a universal serial bus (USB) connection. The charger base 18 includes a recess 24 sized to accommodate and support the electronic smoking device 16 in an upright position, and magnets may be provided to further ensure adequate electrical connection. Terminals 26 may be disposed within the recess 24 and configured to engage complementary terminals of a charge printed circuit board (PCB) 28 (see FIGS. 5 and 6) when the electronic smoking device 16 is supported by the charger base 18.

Figure 2:
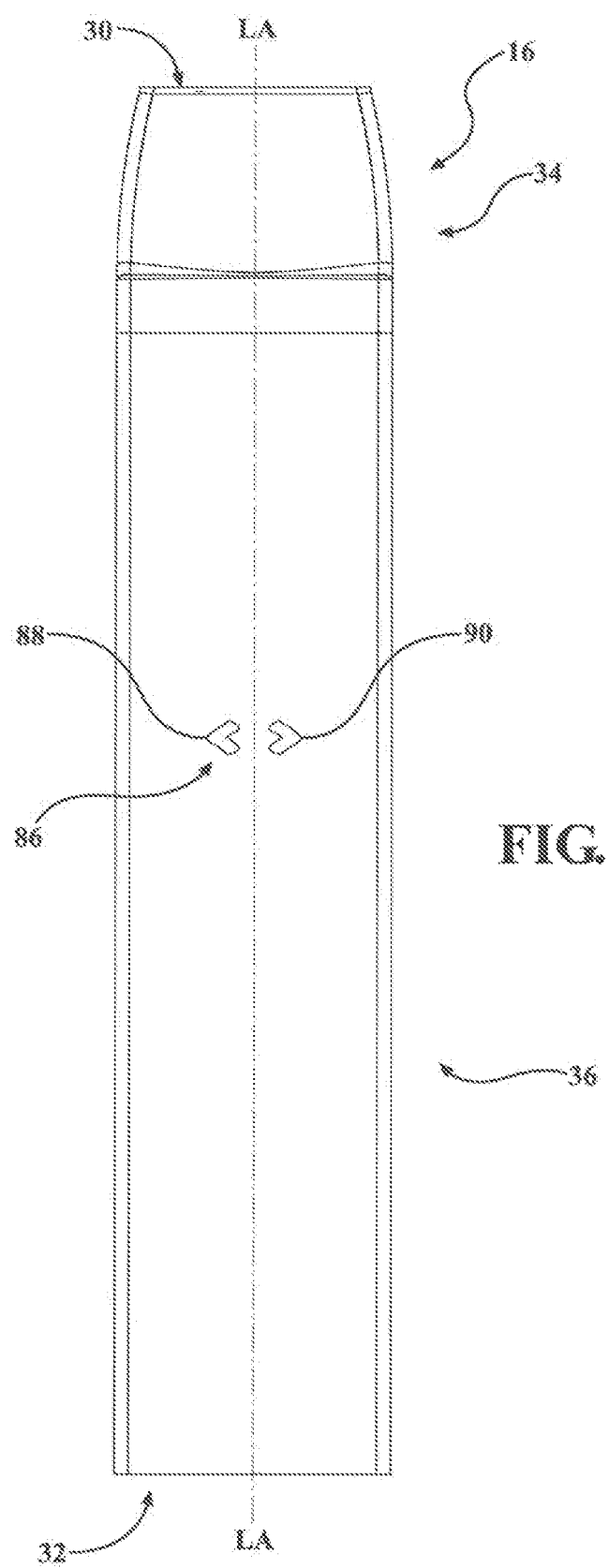
FIG. 2 is a front elevation view of the electronic smoking device.
Figure 3:
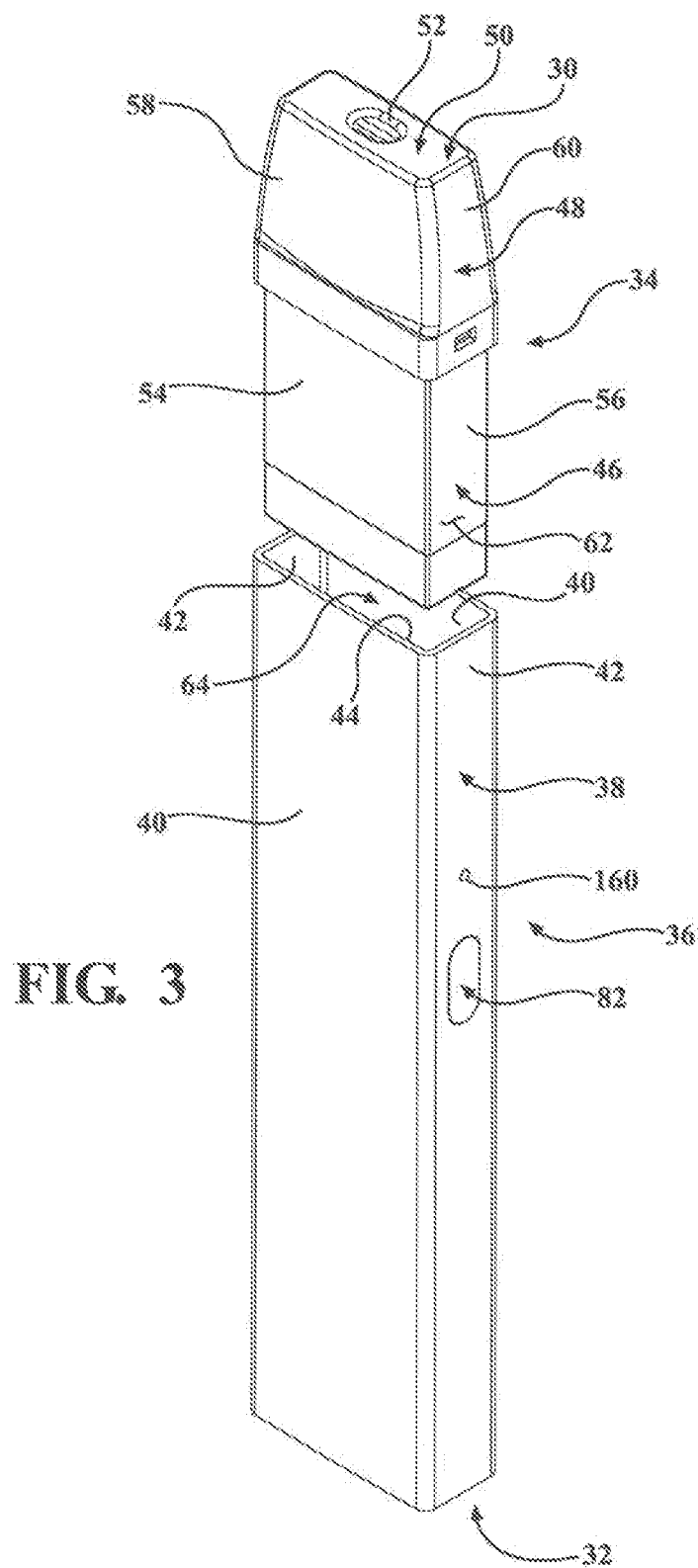
FIG. 3 is a rear perspective view of the electronic smoking device including a cartridge decoupled from a capital assembly.

With further reference to FIGS. 2 and 3, the electronic smoking device 16 includes a proximal end 30, and a distal end 32 opposite the proximal end 30. A length of the electronic smoking device 16 may be defined between the proximal and distal ends 30, 32 that may further define central or longitudinal axis (LA). The length of the electronic smoking device 16 may be greater than a width and greater than a thickness such that the electronic smoking device 16 is elongate in shape and/or non-circular in axial section.

The electronic smoking device 16 includes a cartridge 34 and a capital assembly 36. As implied by their names, the cartridge 34 may be removably coupled the capital assembly 36 and disposable and replaceable, whereas the capital assembly 36 may include components considered to be durable that may not need to be disposed of and replaced. However, it is contemplated that the electronic smoking device 16 may be of unitary construction and disposable.

The capital assembly 36 includes a casing 38. The casing 38 may be elongate and include a first pair of opposing sidewalls 40 and a second pair of opposing sidewalls 42. The first sidewalls 40 may defined the width of the electronic smoking device 16, and the second sidewalls 42 may define the thickness of the electronic smoking device 16. The width may be greater than the thickness such that, with the first and second sidewalls 40, 42 arranged generally perpendicular to one another, the casing 38 is rectangular in section and defines a rectangular-shaped opening 44 of the capital assembly 36. In other words, the casing 38 as well as the electronic smoking device 16 may be non-circular in axial section. The capital assembly 36 may define the distal end 32 of the electronic smoking device 16.

The cartridge 34 includes a housing 46, and a mouthpiece 48 fixedly or removably coupled to the housing 46. The mouthpiece 48 may define a proximal end 50 of the cartridge 34, and the proximal end 30 of the electronic smoking device 16. Further, the mouthpiece 48 may define an opening 52 to facilitate a user drawing vapor through the electronic smoking device 16 in a manner to be further described. The mouthpiece 48 may be coupled to the housing 46 through an interference engagement, as shown in FIG. 3, or other suitable joining means. Each of the housing 46 and the mouthpiece 48 may be non-circular in axial section. The housing 46 may include a first pair of opposing sidewalls 54 and a second pair of opposing sidewalls 56. The first sidewalls 54 may defined the width of the housing 46, and the second sidewalls 56 may define the thickness of the housing 46. The width may be greater than the thickness such that, with the first and second sidewalls 54, 56 arranged generally perpendicular to one another, the housing 46 is rectangular in section and sized to be snugly and slidably inserted into the rectangular-shaped opening 44 of the capital assembly 36. The mouthpiece 48 may also include a first pair of opposing sidewalls 58 and a second pair of opposing sidewalls 60. The first sidewalls 58 may defined the width of the mouthpiece 48, and the second sidewalls 60 may define the thickness of the mouthpiece 48. The width and thickness of the mouthpiece 48 may be slightly greater than the width and thickness of the housing 46, respectively, such that a lip 63 extends around an outer periphery defined by outer surfaces 62 of the sidewalls 58, 60. The lip 63 may engage the rectangular-shaped opening 44 when the cartridge 34 is appropriately disposed within the capital assembly 36 such that the lip 63 provides a depth stop. The sidewalls 58, 60 of the mouthpiece 48 may taper inwardly in the proximal direction to the proximal end 50 to provide comfortable dimensions to the mouthpiece 48 over which the user places his or her mouth. The opening 52 is shown as a singular, oval-shaped opening, however, different quantities, shapes, and configurations of the opening(s) are contemplated.

Figure 4:
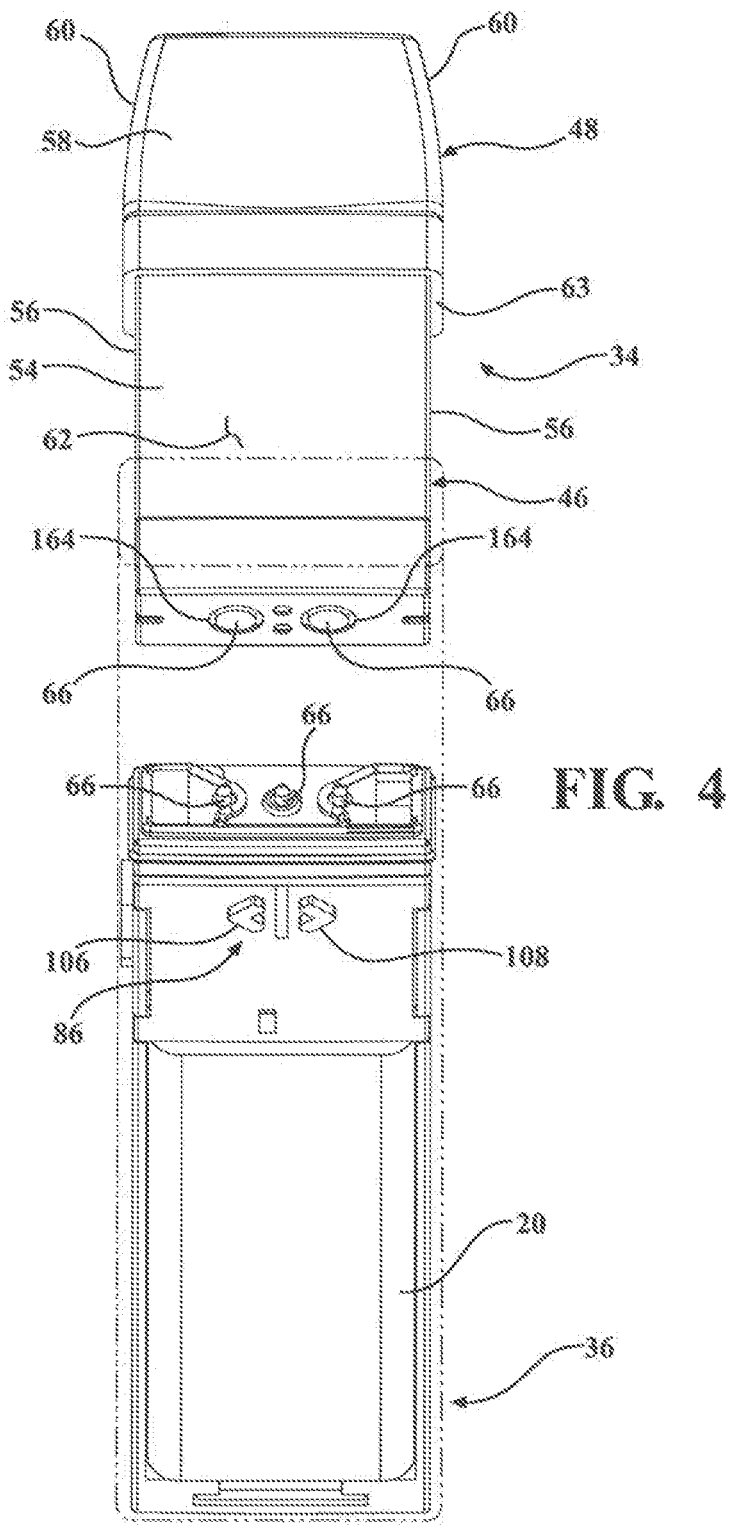
FIG. 4 are perspective views of each of the cartridge and the capital assembly angled towards the viewer to show an interface between the cartridge and the capital assembly.

FIG. 3 shows that at least a portion of the cartridge 34 is configured to be removably disposed within a cavity 64 defined by the casing 38 of the capital assembly 36. FIG. 4 further shows the connection established when the cartridge 34 is operatively coupled to the capital assembly 36. In particular, the cartridge 34 and the capital assembly 36 include complementary contacts 66 that are brought into engagement with one another to provide an electrical connection between electrical components of the capital assembly 36 and electrical components of the cartridge 34, namely the power source 20 and a main PCB assembly 74.

Figure 5:
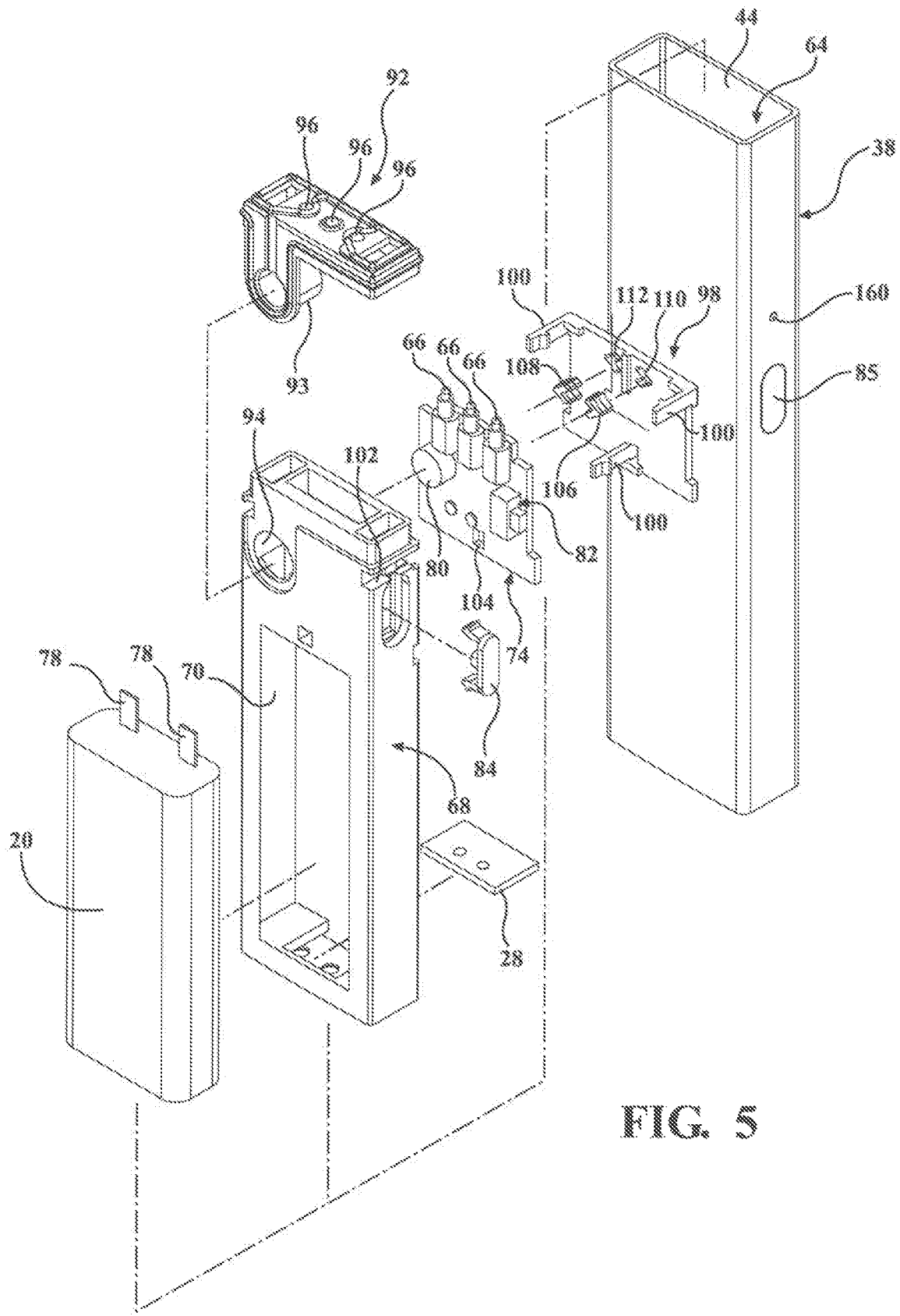
FIG. 5 is a rear exploded view of the capital assembly.
Figure 6:
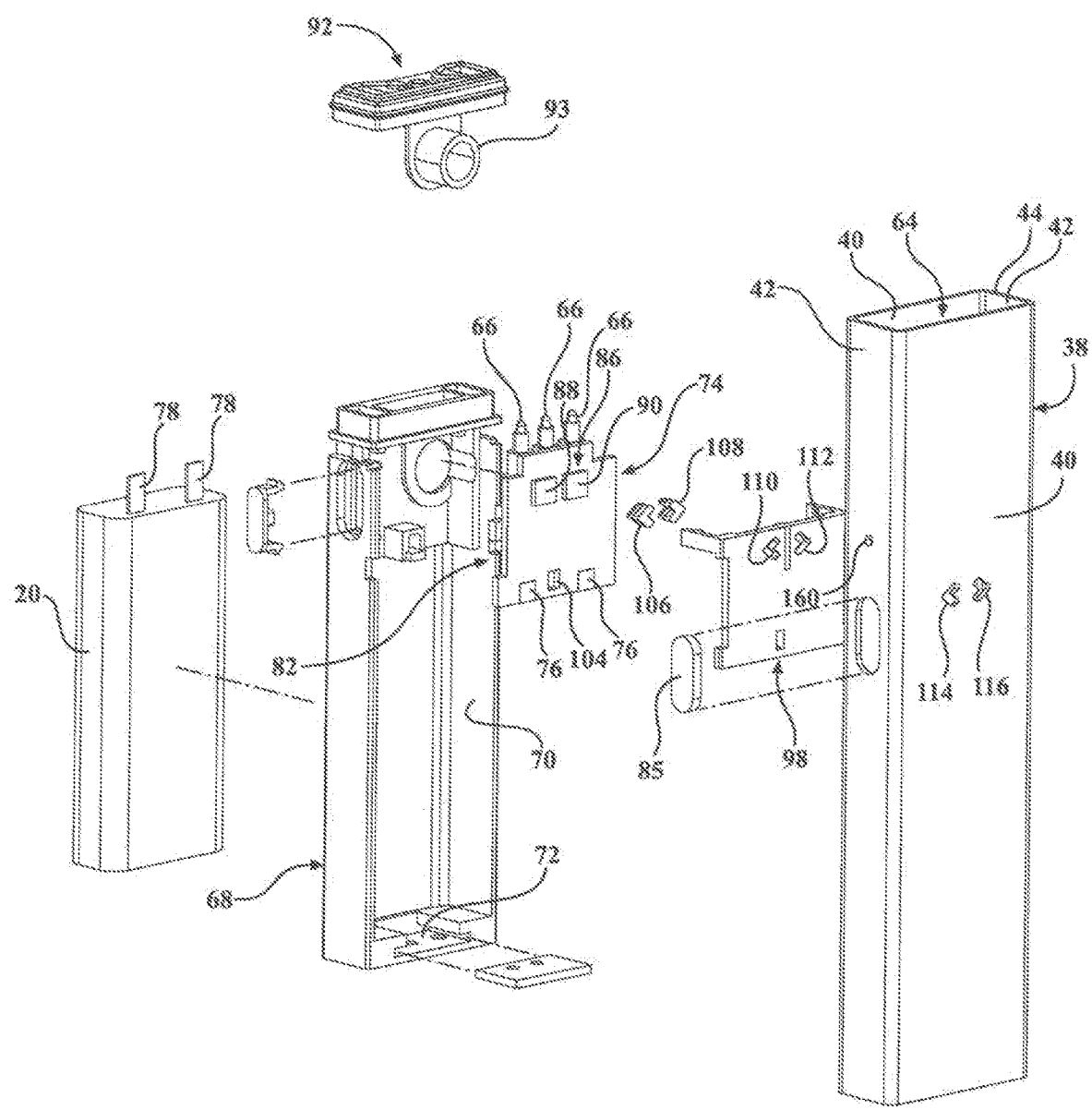
FIG. 6 is a front perspective view of the capital assembly.

Referring now to FIGS. 5 and 6, the capital assembly 36 includes a frame 68 to which the other components of the capital assembly 36 are coupled. The frame 68 defines a window 70 sized to accommodate the power source 20. The frame 68 may further define a slot 72 sized to receive the charge PCB 28. With the power source 20 disposed within the window 70 and the charge PCB 28 disposed within the slot 72, an electrical connection is established between the power source 20 and the charge PCB 28 for transferring energy to the power source 20 when the electronic smoking device 16 is coupled to the charger base 18.

The capital assembly 36 also includes the main PCB assembly 74. The main PCB assembly 74 includes contacts 76 configured to engage contacts 78 of the power source 20 and establish an electrical connection between the main PCB assembly 74 and the power source 20. The main PCB assembly 74 includes a controller 80, and a user input 82 coupled to the controller 80. The user input 82 may include a switch, as best shown in FIG. 5, for example, a momentary switch. The user input 82 is configured to receive at a first user input to place the electronic smoking device 16 in a first state, a second user input to place the electronic smoking device 16 in a second state, and a third user input to place the electronic smoking device 16 in a third state. In manners to be explained in detail, the controller 80 operates the electronic smoking device 16 based on the state of the electronic smoking device 16. A button 84 may be coupled to the frame 68 and disposed in proximity to the user input 82, and a cover 85 may be coupled to the casing 38 and disposed over the button 84. The user input 82 and/or the button 84 may be coupled to the frame 68 in a manner to provide tactile feedback to the user with each depression and/or release of the user input 82. The repeated actuation of the user input 82 may be configured to toggle between the first, second, and third states.

The main PCB assembly 74 includes an indicator assembly 86 in communication with the controller 80. As best shown in FIG. 6, the indicator assembly 86 includes a first indicator light 88 and a second indicator light 90. The first and second indicator lights 88, 90 may be arranged in a side-by-side configuration in a manner to be described. The controller 80 is further configured to operate said indicator assembly 86 to provide a first visual output in response to the user input 82 receiving the first user input, a second visual output different than said first visual output in response to the user input 82 receiving the second user input, and a third visual output different than said first and second visual outputs in response to the user input 82 receiving the third user input.

The contacts 66 of the capital assembly 36 may be coupled to or part of the main PCB assembly 74. A cap 92 may be coupled to the frame 68 to seal off the components of the capital assembly 36 when disposed in the casing 38. In particular, the cap 92 may be made of silicone for thermal resistivity, and the cap 92 may include a head 93 disposed through an aperture 94 of the frame 68 to at least partially surround the controller 80. The cap 92 may further define openings 96 through which the contacts 66 extend in a sealed manner. Further, the cap 92 may be disposed within the casing 38 in a sealed manner. As such, owing to the resilient nature of the cap 92, ingress of liquid and/or particulate through or around the cap 92 is prevented, thereby preventing the liquid and/or particulate from compromising function of the main PCB assembly 74, the indicator assembly 86, power source 20, and the like.

The capital assembly 36 includes a PCB cover 98 configured to be coupled to the frame 68. The PCB cover 98 is coupled to the frame 68 in a manner to sandwich or encapsulate the main PCB assembly 74. The PCB cover 98 includes barbs 100 extending from an inner surface of the PCB cover 98 with the barbs 100 configured to engage slots 102 of the frame 68 in an interference engagement. The main PCB assembly 74 may include a slot 104 through which the one of the barbs 100 extends to further fix the main PCB assembly 74 into position.

With continued reference to FIGS. 5 and 6, the indicator assembly 86 may include a first light pipe or lens 106 and a second light pipe or lens 108. The first lens 106 is configured to be operatively coupled to the first indicator light 88, and the second lens 108 is configured to be operatively coupled to the second indicator light 90. More particularly, the first lens 106 is configured to be positioned in abutment or adjacent to the first indicator light 88, and the second lens 108 is configured to be positioned in abutment or adjacent to the second indicator light 90. With the first and second indicator lights 88, 90 operatively coupled to the first and second lens 106, 108, respectively, light outputted from the first and second indicator lights 88, 90 is transmitted through the first and second lens 106, 108, respectively. Whereas the first and second indicator lights 88, 90 may be non-specific in shape, the first and second lens 106, 108 may be arrows or chevrons in shape.

The first lens 106 may be supported in a first aperture 110 of the PCB cover 98, and the second lens 108 may be supported in a first aperture 112 of the PCB cover 98. As shown in FIGS. 5 and 6, the first and second apertures 110, 112 may be arrows or chevrons in shape complementary to the shape of the first and second lens 106, 108. Likewise, the casing 38 may include a first aperture 114 and a second aperture 116 complementary to the first and second apertures 110, 112. In particular, one of the first sidewalls 40 of the casing 38 defines the first and second apertures 114, 116. With the frame 68 and the PCB cover 98 coupled thereto disposed within the casing 38, the first and second apertures 114, 116 are aligned with the first and second apertures 110, 112 of the PCB cover 98, the first and second lens 106, 108, and the first and second indicator lights 88, 90. The first and second lens 106, 108 may be at least partially supported by the first and second apertures 114, 116 of the casing 38. The arrangement results in light being outputted by at least one of the first and second indicator lights 88, 90 being visible to the user viewing a front of the casing 38. The light may appear to the user as chevrons.

Figure 8:
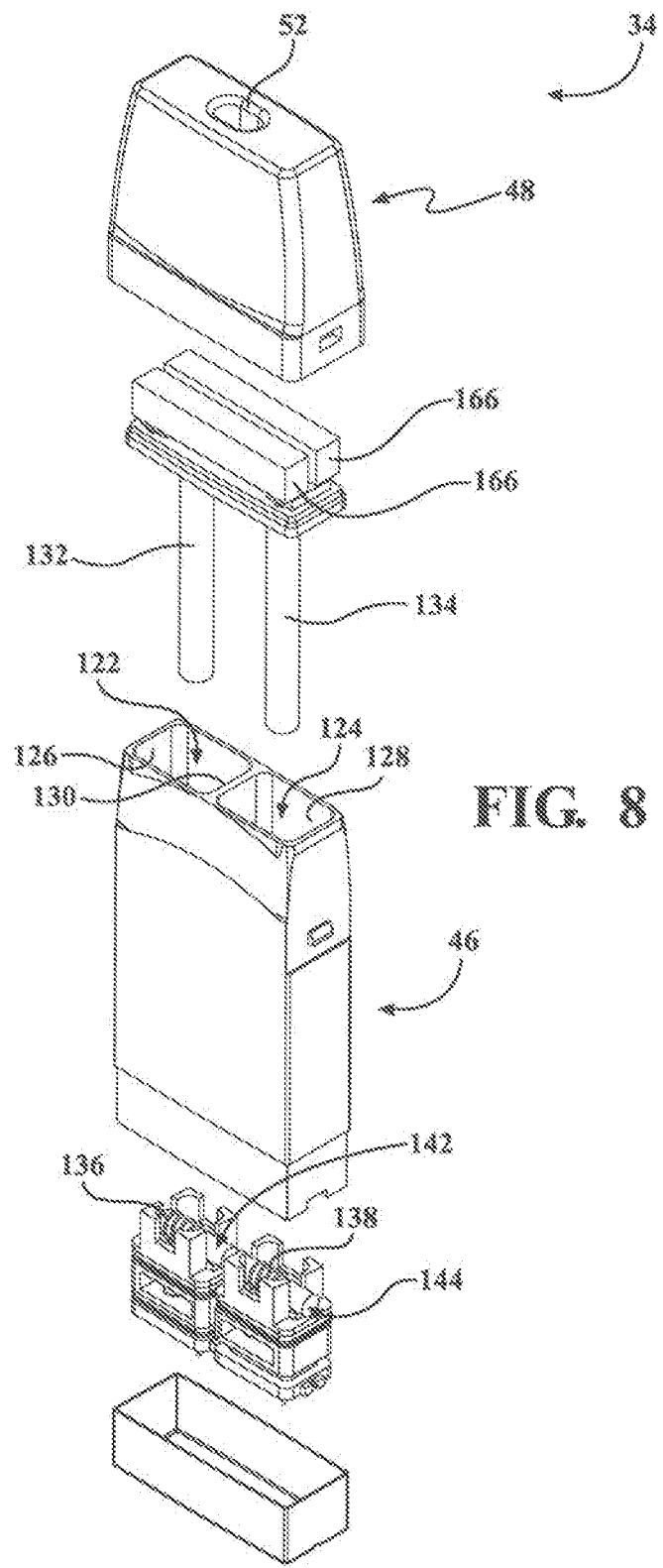
FIG. 8 is an exploded view of the cartridge.
Figure 9:
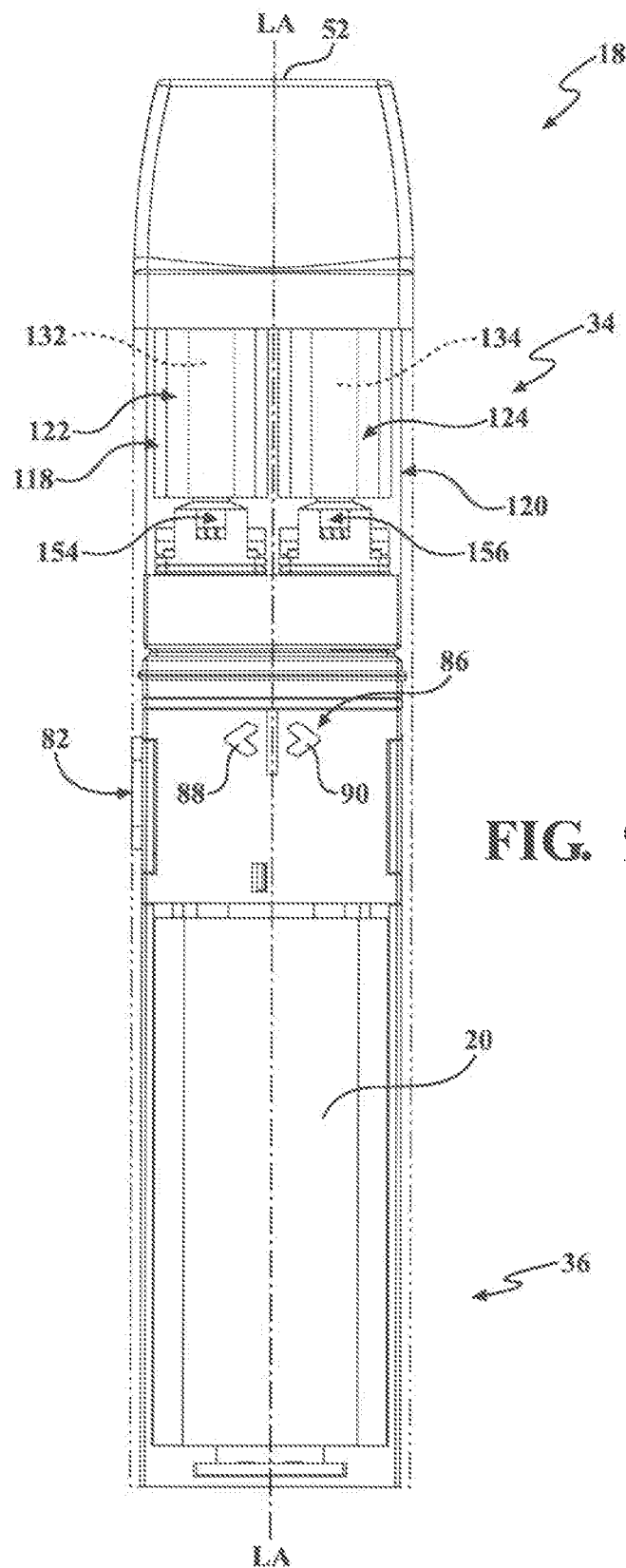
FIG. 9 is a front elevation view of the electronic smoking device with a casing shown in phantom.
Figure 10:
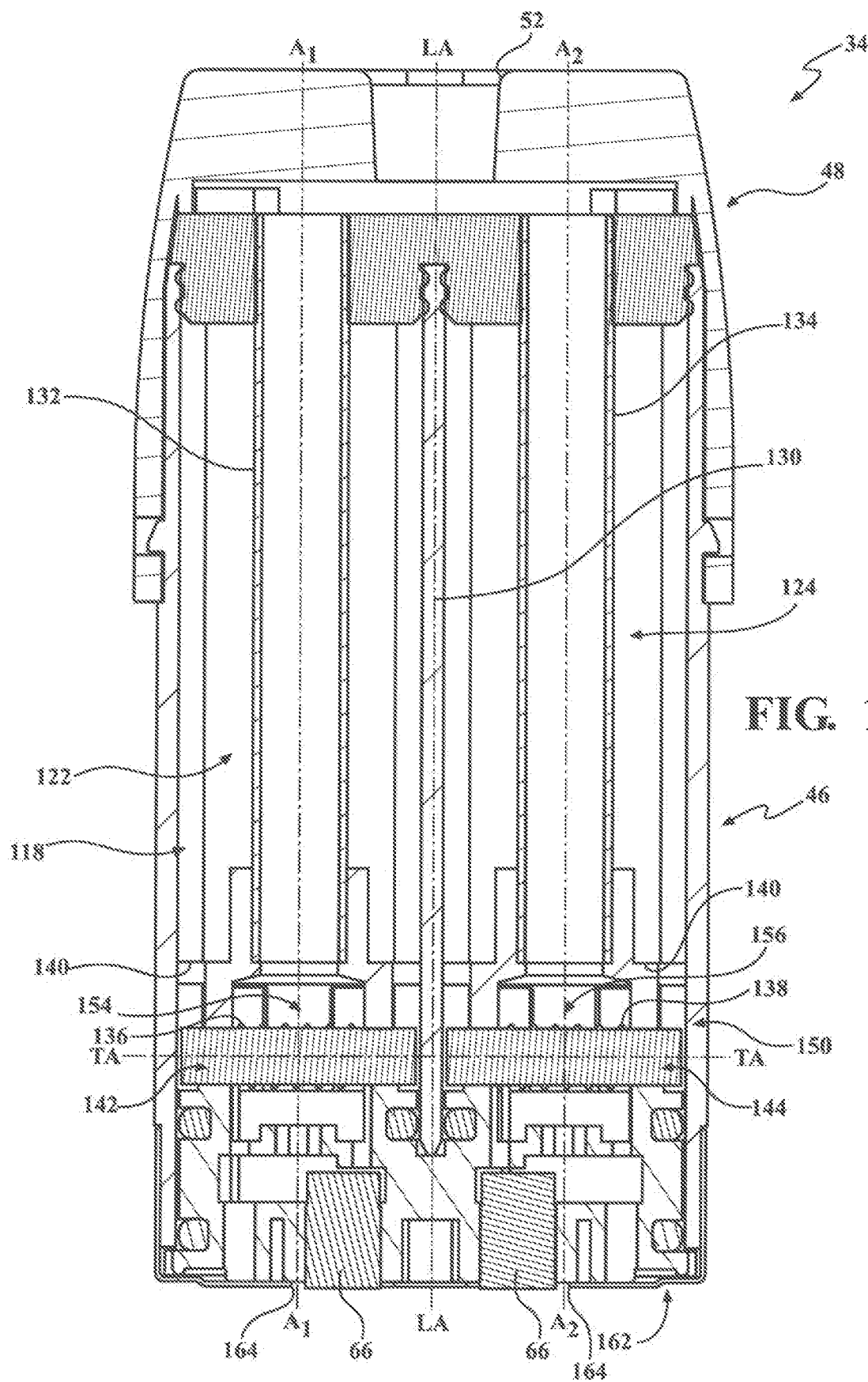
FIG. 10 is a sectional view of the cartridge of FIG. 7 taken along section lines 10-10.

Referring now to FIGS. 8-10, the cartridge 34 is shown including the housing 46 and the mouthpiece 48. The cartridge 34 includes a first atomizer 118, and a second atomizer 120 arranged in a parallel configuration with the first atomizer 118. In other words, the first and second atomizer 118, 120 may be considered arranged in a side-by-side configuration and/or mirrored about a plane extending front-to-back through the longitudinal axis. The first atomizer 118 includes a first reservoir 122 configured to store a first liquid vaporizable material, and a second reservoir 124 configured to store a first liquid vaporizable material. FIG. 10 shows the first reservoir 122 generally oriented on a first axis (A1) and the second reservoir 124 generally oriented on a second axis (A2) with the first and second axes being parallel to one another and parallel to the longitudinal axis.

The first and second reservoirs 122, 124 may be defined within portion of the housing 46. FIG. 8 best shows the housing 46 defining two square- or rectangular-shaped bores 126, 128 separated by a partition 130. The first and second bores 126, 128 may define outer surfaces of the first and second reservoirs 122, 124, respectively. The cartridge 34 may further include a first chimney 132 and a second chimney 134 coaxially disposed within the first and second bores 126, 128, respectively. The first and second chimney 132, 134 may cylindrical-shaped tubes having a diameter less than a width and thickness of the first and second bores 126, 128, respectively. The first and second chimneys 132, 134 may define inner surfaces of the first and second reservoirs 122, 124, respectively. In other words, the first and second reservoirs 122, 124 may be defined between the first and second bores 126, 128 and the first and second chimneys 132, 134.

Figure 11:
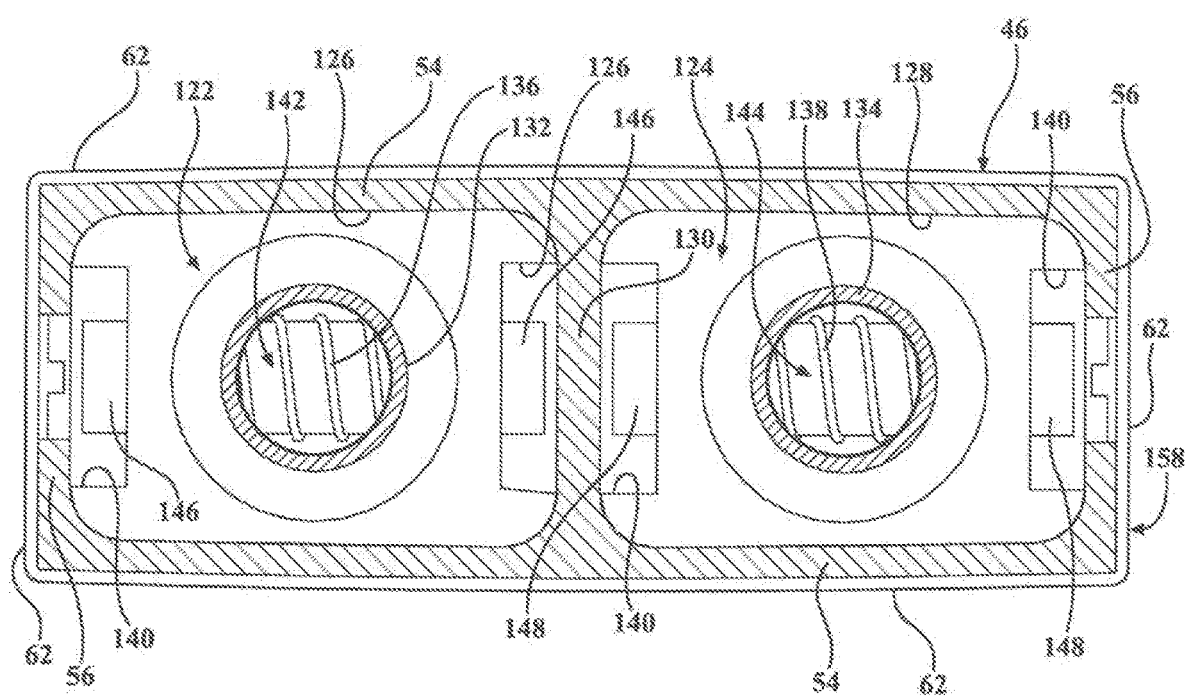
FIG. 11 is a top plan view of the cartridge of FIG. 7 taken along section lines 11-11.

The cartridge 34 includes a first heating element 136 and a second heat element 138. The first and second heating elements 136, 138 are in fluid communication with the first and second reservoirs 122, 124. With further reference to FIGS. 10 and 11, the housing 46 may define at least one aperture 140 with a lower wall to provide the fluid communication between the first and second reservoirs 122, 124 and a first wick 142 and a second wick 144, respectively, disposed beneath the lower wall. More specifically, the first wick 142 may be an elongate cylinder having opposing ends 146 oriented widthwise beneath the first reservoir 122. The opposing ends 146 are positioned beneath the apertures 140 to provide fluid communication between the first reservoir 122 and the first wick 142. Likewise, the second wick 144 may be an elongate cylinder having opposing ends 148 oriented widthwise beneath the second reservoir 124. The opposing ends 148 are positioned beneath the apertures 140 to provide fluid communication between the second reservoir 124 and the second wick 144.

Figure 12:
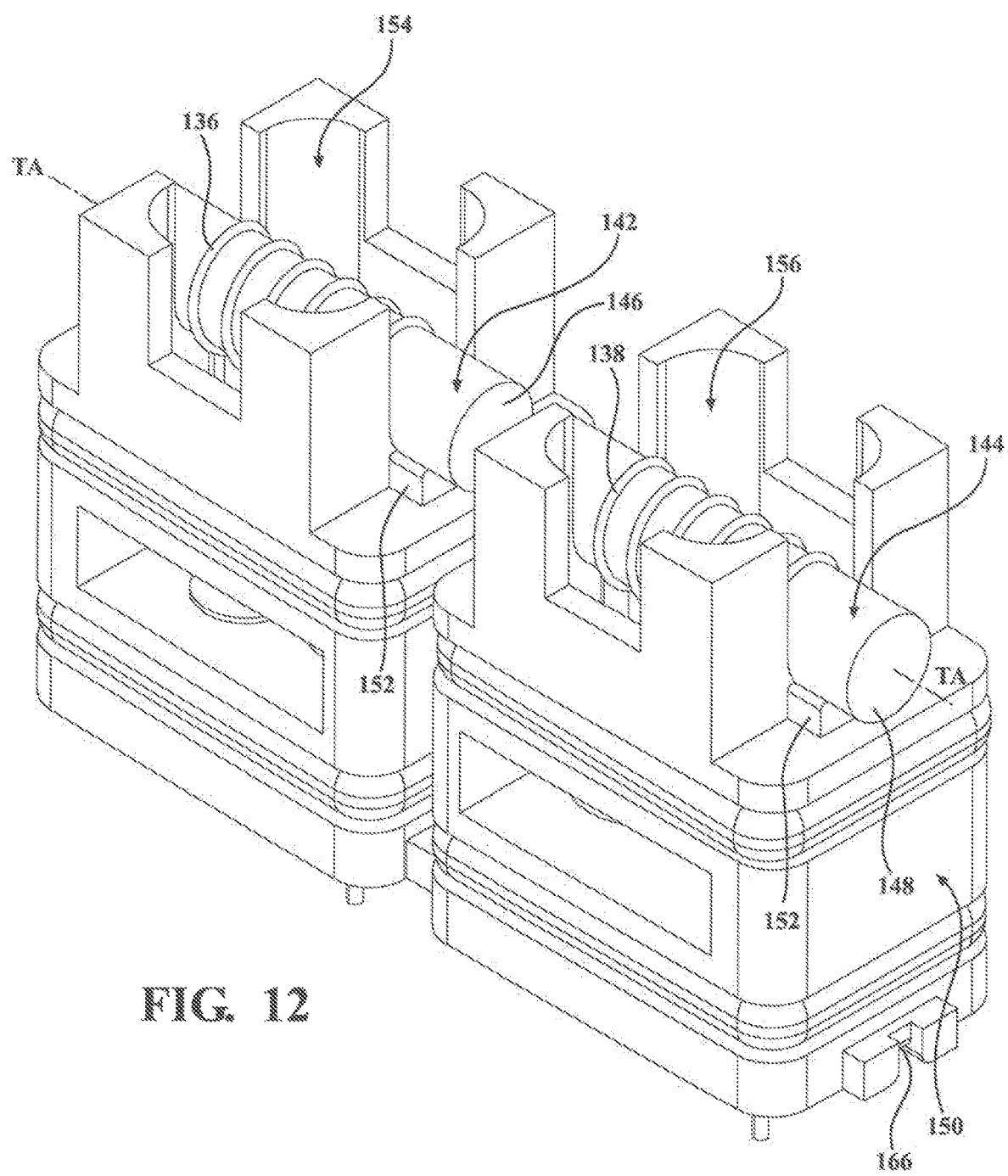
FIG. 12 is a perspective view of select componentry of a first and second atomizer.

As best shown in FIGS. 10-12, the first heating element 136 may be a resistive wire helically wrapped around the first wick 142, and the second heating element 138 may be another resistive wire helically wrapped around the second wick 144. The first and second heating elements 136, 138 are coupled to the contacts 66 that are brought into engagement with the contacts 66 of the capital assembly 36 when the cartridge 34 is removably coupled with the capital assembly 36. The first and second heating elements 136, 138 and the first and second wicks 142, 144 may be supported on a cradle assembly 150 shown in FIG. 12. The cradle assembly 150 is coupled to the housing 46, as generally reflected in FIG. 8, such that the first and second heating elements 136, 138 and the first and second wicks 142, 144 are separated by the partition 130 and positioned beneath the first and second reservoirs 122, 124, respectively. The cradle assembly 150 may include supports 152 upon which the first and second wicks 142, 144 rest. The supports 152 are arcuate and shape and cooperate with arcuate barriers (not shown) of the housing 46 to fluidly isolate first and second vaporization chambers 154, 156 from the first and second reservoirs 122, 124, respectively, while the opposing ends 146, 148 of the first and second wicks 142, 144 to be in fluid communication with the first and second reservoirs 122, 124. In other words, the first and second heating elements 136, 138 and the first and second vaporization chambers 154, 156 surrounding the first and second heating elements 136, 138 are not flooded with the first and second liquid vaporizable material stored in the first and second reservoirs 122, 124. Rather capillarity effect from the first and second wicks 142, 144 draw the first and second liquid vaporizable material near or into contact with the first and second heating elements 136, 138, after which operation of the first and second heating elements 136, 138 vaporizes the first and second liquid vaporizable material to produce the first and second vapor, respectively. FIGS. 11 and 12 show that the first and second vaporization chambers 154, 156 in fluid communication with the first and second chimneys 132, 134, respectively. After the first and second vapor is produced, the first and second vapor may be drawn through the first and second chimneys 132, 134, respectively, to the opening 52 at the proximal end 50 of the mouthpiece 48.

As previously mentioned, known electronic smoking devices that separately store more than one e-liquid fail to do so in in smaller form factor. For example, two cylindrical reservoirs disposed within an outer cylindrical or rectangular housing fail to maximize volume that may otherwise be used to increase the amounts of the e-liquids storable with the cartridge. The electronic smoking device 16 of the present disclosure provides maximizes the volume of the first and second reservoirs 122, 124 of the cartridge 34. The first and second reservoirs 122, 124 are non-circular in axial section and in a parallel arrangement to one another and configured to be inserted in the rectangular-shaped opening 44 of the capital assembly 36. More particularly and with reference to FIG. 11, the first and second sidewalls 54, 56 have an outer surface 62 opposite the first and second bores 126, 128 that define an outer periphery 158 of the housing 46 that is rectangular in shape. Moreover, as mentioned, the first and second bores 126, 128 at least partially defining the first and second reservoirs 122, 124 may be square or rectangular in axial section. Thus, the square or rectangular shape of the first and second reservoirs 122, 124 within the rectangular-shaped outer periphery 158 maximizes the space within the cartridge 34. For examples, the form factor of the cartridge 34 may be reduced for specified volumes of the e-liquids, or the volume of the e-liquids may be maximized for a specified form factor of the cartridge 34.

Further realization of space efficiency is realized with the positioning and orientation of the first and second heating elements 138, 138 and the first and second wicks 142, 144. With continued reference to FIGS. 10-12, the first and second wicks 142, 144 are disposed widthwise within the cartridge 34. More particularly, the first and second wicks 142, 144 are oriented on a transverse axis TA transverse to the longitudinal axis LA of the cartridge 34 and of the electronic smoking device 16. The widthwise positioning provides for the first and second wicks 142, 144 to be relatively larger (than if positioning thickness-wise), thereby enhancing the vaporization capability of the electronic smoking device 16. Moreover, the first and second wicks 142, 144 may be collinear with one another, as best shown in FIGS. 11 and 12. Each of the first and second wicks 142, 144 may be oriented on the same axis, namely the transverse axis TA. Likewise, the first and second heating elements 136, 138 may be disposed widthwise within the cartridge 34, oriented on (i.e., coiled about) the transverse axis TA, and/or collinear with one another. Among other advantages, the aforementioned positioning of the first and second heating elements 136, 138 and the first and second wicks 142, 144 may facilitate the generally parallel arrangement of the electronic smoking device 16 in a space-efficient manner.

As previously mentioned, the first and second reservoirs 122, 124 are configured to store the first and second liquid vaporizable materials, respectively. The electronic smoking device 16 is operable to selectively vaporize the first liquid vaporizable material, the second liquid vaporizable material, and both the first and second liquid vaporizable materials (also referred to herein as the e-liquids). In one example, the first and second liquid vaporizable materials are different flavors, and depending on user preference, one of the flavors or a blend of the flavors may be provided as a vapor drawable through the opening 52 of the mouthpiece 48. The electronic smoking device 16 of the present disclosure advantageously provides for an intuitive and efficient manner by which to select which one or more of the liquid vaporizable materials is to be vaporized, and/or to indicate to the user which one or more of the liquid vaporizable materials is being vaporized during operation of the electronic smoking device.

Referring to FIG. 9, the user input 82 is configured to configured to receive at a first user input to place the electronic smoking device 16 in the first state, a second user input to place the electronic smoking device 16 in the second state, and a third user input to place the electronic smoking device 16 in the third state. The first state may be associated with vaporizing of the first liquid vaporizable material from the first reservoir 122, the second state may be associated with vaporizing of the second liquid vaporizable material from the second reservoir 124, and the third state may be associated with vaporizing of the first and second liquid vaporizable material from the first and second reservoirs 122, 124, respectively. The vaporization of the first and second liquid vaporizable material from the first and second reservoirs 122, 124, respectively, may be simultaneous. For example, should the user wish to have vapor of the first flavor associated with the first liquid vaporizable material in the first reservoir 122, the user may provide the first user input to the user input 82. For another example, should the user wish a blended vapor of the first and second flavors associated with the first and second liquid vaporizable materials in the first and second reservoirs 122, 124, the user may provide the third user input to the user input 82. The first, second, and third user inputs may include repeated actuation of the user input 82. In other words, the user may actuate the user input 82 a first time to place to place the electronic smoking device 16 in the second state, actuate the user input 82 a second time to place the electronic smoking device 16 in the second state, and actuate the user input 82 a third time to place the electronic smoking device 16 in the third state. A fourth actuation to the user input 82 may again place the electronic smoking device 16 in the first state, and so on.

Especially because of the toggling nature of the user input 82, the indicator assembly 86 advantageously provides an output based on the user input. As a result, the user can readily ascertain in which state the electronic smoking device 16 is such that, should the electronic smoking device 16 being operated, the user knows which liquid vaporizable material is to be vaporized. The controller 80 is configured to operate the indicator assembly 86 to provide a first visual output in response to the user input 82 receiving the first user input, a second visual output different than the first visual output in response to the user input 82 receiving the second user input, and a third visual output different than the first and second visual outputs in response to the user input 82 receiving the third user input. The first, second, and third visual outputs may be selective lighting of the first and second indicator lights 88, 90 to be described, however, other visual and other outputs are contemplated. For example, more than two indicator lights may be provided each associated with one of the states of the electronic smoking device 16. For another example, both the first and second indicator lights 88, 90 are illuminated in each state, but a color of the light(s) is associated with the states of the electronic smoking device 16. Still further, audible, tactile, and other feedback and indicia to the user are contemplated.

FIG. 9 shows the first and second indicator lights 88, 90 arranged in parallel arrangement complementary to the parallel arrangement of the first and second atomizers 118, 120. Further, the first and second indicator lights 88, 90 are centered between opposing sides of the capital assembly 36 and positioned on opposite sides of the longitudinal axis LA of the electronic smoking device 16, as are the first and second atomizers 118, 120. In one implementation, owing to the shape of the first and second apertures 110, 112, 114, 116 in each of the PCB cover 98 and the casing 38 (see FIG. 6), the first indicator lights 88, 90 output light shaped as chevrons oriented sideways facing towards the opposing sides of the capital assembly 36. From the positioning, alignment, shape, and nature of operation of the indicator assembly 86, it readily follows that when the first indicator light 88 is illuminated, the user can expect the first atomizer 118 to be operated with operation of the electronic smoking device 16. Likewise, when the second indicator light 90 is illuminated, the user can expect the second atomizer 120 to be operated with operation of the electronic smoking device 16. When the first and second indicator lights 88, 90 are illuminated, the user can expect the first and second atomizers 118, 120 to be operated, perhaps simultaneously, with operation of the electronic smoking device 16.

In the example using flavors, the user may actuate the user input 82 a first time, and the first indicator light 88 is illuminated. The user can expect that with operation of the electronic smoking device 16, the first flavor of e-liquid from the first reservoir 122 will be vaporized. If the user input 82 is actuated a second time, the second indicator light 90 is illuminated. The user can expect that with operation of the electronic smoking device 16, the second flavor of e-liquid from the second reservoir 124 will be vaporized. If the user input 82 is actuated a third time, the first and second indicator lights 88, 90 are illuminated. The user can expect that with operation of the electronic smoking device 16, a vapor blend of the first and second flavors of e-liquid will be produced.

One the user is satisfied with the selection as reflected by the indicator assembly 86, the user may operate the electronic smoking device 16. In one implementation, a sensor (not shown) in communication with the controller 80 may be provided to sense a draw on the mouthpiece 48 resulting in a decrease in pressure. A sensor suitable of the present application is disclosed in U.S. Pat. No. 10,231,488, issued Mar. 19, 2019, the entire contents of which are hereby incorporated by reference. In another implementation, a second user input may be actuated while the draw is performed. The controller 80 configured to operate the power source 20 to activate the first heating element 136 with operation of the electronic smoking device 16 in the first state, activate the second heating element 138 with operation of the electronic smoking device 16 in the second state, and activate both the first and second heating elements 136, 138 with operation of the electronic smoking device 16 in the third state. In other words, based on the state of the electronic smoking device 16, as stored in memory (not shown) in communication with the controller 80, the controller 80 transmits electric power through a select one or more of the contacts 66 of the main PCB assembly 74, which are in electrical connection with the contacts 66 respectively in electrical connection with the first and second heating elements 136, 138. The electrical power being supplied to the first and/or second heating elements 136, 138 respectively heats the e-liquid(s) on surfaces of the first and/or second wicks 142, 144, thereby producing the first and/or second vapors, respectively.

The controller 80 may be further configured to control the indicator assembly 86 to illuminate the first indicator light 88 with activation of the first heating element 136, illuminate the second indicator light 90 with activation of the second heating element 138, and illuminate both of the first and second lights 88, 90 with activation of both of the first and second heating elements 136, 138. Thus, while the user is operating the electronic smoking device 16, the indicator assembly 86 alerts or reminds the user to which one or more flavors of vapor to expect. The controller 80 may control the indicator assembly 86 to automatically illuminate or cease illumination with initiation or cessation of the draw on the mouthpiece 48.

In certain implementations, after cessation of the draw on the mouthpiece 48, the memory stores the state of the electronic smoking device 16. If, later, the user initiates another draw on the mouthpiece 48, the electronic smoking device 16 operates in a manner previously described based on the stored state. The arrangement prevents the need for the user to provide input(s) to the user input 82 to take another draw with the same flavor profile as the previous draw. It is contemplated that features may be included that provide for stored user profiles (for multiple users) as well as variable blend control. In certain implementations, the first and second heating elements 136, 138, when operated simultaneously, receive the same voltage and thus produce the same amount of vapor (e.g., an equal blend of the first and second flavors). In other implementations, the user may select a blend ratio that is weighted towards one of the two flavors. For example, the user may selectively tune one of the first and second heating elements 136, 138 to operate at half strength with the result being a 75%-25% blend of the first and second flavors. Other related operational parameters are contemplated and within the scope of the present disclosure.

Figure 7:
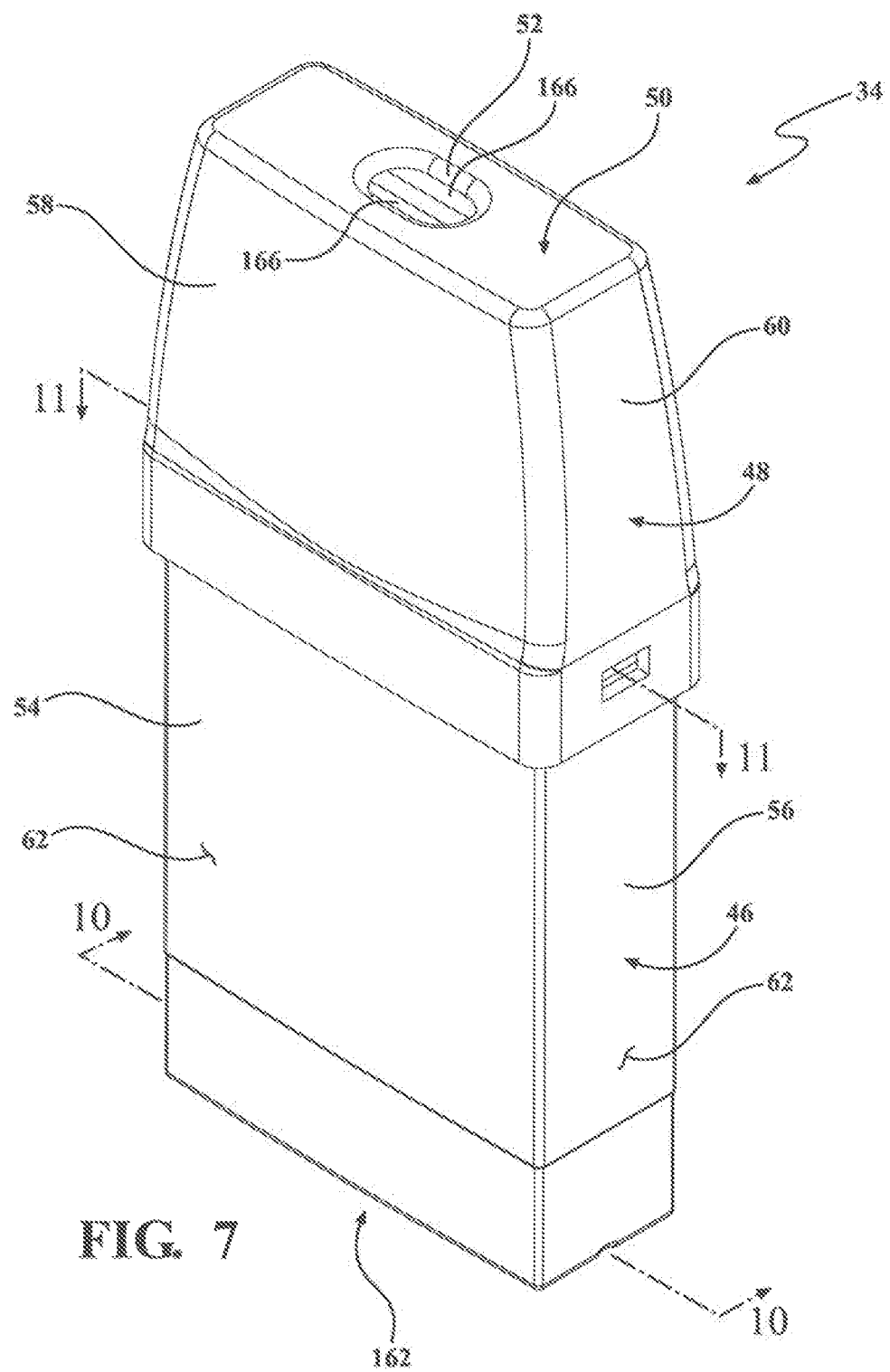
FIG. 7 is a perspective view of the cartridge.

As the user draws on the mouthpiece 48, air enters the electronic smoking device 16 through an inlet 160, as shown in FIGS. 1, 3, 5 and 6. The inlet 160 is defined by the casing 38 and at an axial position approximately between a distal end 162 of the cartridge 34 (see FIGS. 7 and 10) and the cap 92 of the capital assembly 36. A schematic representation of flow paths is shown in FIG. 10. The air enters through apertures 164 (see FIG. 4) and through openings associated with the cradle assembly 150. The air passes into the first and second vaporization chambers 154, 156 and across the first and second heating elements 136, 138 with at least one of the first and second heating elements 136, 138 vaporizing the e-liquid(s). The air-vapor mixture (or air) is drawn through the first and second chimneys 132, 134, and combine into a single flow path in the mouthpiece 48. The air-vapor mixture passes between sorbent 166 disposed within the mouthpiece 48, for example, two elongate members spaced apart from one another to define a gap aligned with the opening 52 along the longitudinal axis (see FIGS. 7 and 8). The sorbent 166 absorbs fluid in the air-vapor mixture. The air-vapor mixture is drawn through the opening 52 and into the user's mouth. As mentioned, the single flow path is generated in the mouthpiece 48 after vaporization of the separate e-liquids. The arrangement of combining the flavors as air-vapor mixtures produces better tasting results than combining the e-liquids into a solution then vaporizing.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. An electronic smoking device comprising:
 a cartridge comprising:
  a mouthpiece defining an opening;
  a first atomizer comprising a first reservoir configured to store a first liquid vaporizable material, and a first heating element operable to vaporize the first liquid vaporizable material to provide a first vapor drawable through said opening of said mouthpiece;
  a second atomizer arranged in a parallel configuration with said first atomizer, said second atomizer comprising a second reservoir configured to store a second liquid vaporizable material, and a second heating element operable to vaporize the second liquid vaporizable material to provide a second vapor drawable through said opening of said mouthpiece;
 a capital assembly configured to be removably coupled to said cartridge, said capital assembly comprising:
  a controller;
  a power source in communication with said controller, said power source configured to provide energy to activate at least one of said first and said second heating elements when said capital assembly is removably coupled with said cartridge;
  an indicator assembly in communication with said controller; and
  a user input in communication with said controller, said user input configured to receive at a first user input to place said device in a first state, a second user input to place said device in a second state, and a third user input to place said device in a third state,
 wherein said controller is configured to operate said power source to activate said first heating element with operation of said device in said first state, activate said second heating element with operation of said device in said second state, and activate both of said first and second heating elements with operation of said device in said third state,
 wherein said controller is further configured to operate said indicator assembly to provide a first visual output in response to said user input receiving the first user input, a second visual output different than said first visual output in response to said user input receiving the second user input, and a third visual output different than said first and second visual outputs in response to said user input receiving the third user input.

2. The electronic smoking device of claim 1, wherein said indicator assembly further comprises a first indicator light and a second indicator light.

3. The electronic smoking device of claim 2, wherein said first visual output includes illumination of first indicator light, said second visual output includes illumination of said second indicator light, and said third visual output includes illumination of both of said first and second indicator lights.

4. The electronic smoking device of claim 2, wherein said first indicator light and said second indicator light are arranged in a parallel arrangement complementary to the parallel arrangement of said first and second atomizers.

5. The electronic smoking device of claim 1, wherein said user input further comprises a button such that repeated actuation of said button toggles said device between said first, second, and third states.

6. The electronic smoking device of claim 1, wherein said controller is further configured to operate said indicator assembly to provide said first visual output with operation of said device in said first state, said second visual output in said second state, and said third visual in said third state.

7. An electronic smoking device comprising:
a cartridge comprising:
  a mouthpiece defining an opening;
  a first atomizer comprising a first reservoir configured to store a first liquid vaporizable material, and a first heating element operable to vaporize the first liquid vaporizable material to provide a first vapor drawable through said opening of said mouthpiece;
  a second atomizer arranged in a parallel configuration with said first atomizer, said second atomizer comprising a second reservoir configured to store a second liquid vaporizable material, and a second heating element operable to vaporize the second liquid vaporizable material to provide a second vapor drawable through said opening of said mouthpiece;
a capital assembly configured to be removably coupled to said cartridge, said capital assembly comprising:
  a controller;
  a power source in communication with said controller, said power source configured to provide energy to activate at least one of said first and said second heating elements when said capital assembly is removably coupled with said cartridge; and
  an indicator assembly in communication with said controller, said indicator assembly comprising a first indicator light and a second indicator light,
wherein said controller is configured to illuminate said first indicator light with activation of said first heating element, illuminate said second indicator light with activation of said second heating element, and illuminate both of said first and second lights with activation of both of said first and second heating elements.

8. The electronic smoking device of claim 7, wherein said first indicator light and said second indicator light are arranged in a parallel arrangement complementary to the parallel arrangement of said first and second atomizers.

9. The electronic smoking device of claim 7, further comprising a user input in communication with said controller, said user input configured to receive user inputs to place said device in one of a plurality of states.

10. The electronic smoking device of claim 9, wherein said user input further comprises a button configured to toggle said device between said plurality of states.

11. The electronic smoking device of claim 10, wherein said controller is further configured to illuminate said first indicator light and/or said second indicator light as said device is toggled between said plurality of states.

12. An electronic smoking device comprising:
a cartridge comprising:
  a mouthpiece defining an opening;
  a first atomizer comprising a first reservoir configured to store a first liquid vaporizable material of a first flavor, a first heating element operable to vaporize the first liquid vaporizable material;
  a second atomizer arranged in a parallel configuration with said first atomizer, said second atomizer comprising a second reservoir configured to store a second liquid vaporizable material of a second flavor different than the first flavor, a second heating element operable to vaporize the second liquid vaporizable material;
a capital assembly configured to be removably coupled to said cartridge, said capital assembly comprising:
  a controller;
  a power source in communication with said controller, said power source configured to provide energy to activate at least one of said first and said second heating elements when said capital assembly is removably coupled with said cartridge; and
  an indicator assembly in communication with said controller,
wherein said controller is further configured to operate said indicator assembly to provide a first visual output indicative vaporization of the first liquid vaporizable material such that vapor of the first flavor is drawable through said opening of said mouthpiece, provide a second visual output different than said first visual output indicative of vaporization of the second liquid vaporizable material such that the vapor of the second flavor is drawable through said opening of said mouthpiece, and provide a third visual output different than said first and second visual outputs and indicative of simultaneous vaporization of the first and second liquid vaporizable materials such that vapor of a blend of the first and second flavors is drawable through said opening of said mouthpiece.

13. The electronic smoking device of claim 12, wherein said indicator assembly comprising a first indicator light and a second indicator light, wherein said first visual output includes illumination of said first indicator light, said second visual output includes illumination of said second indicator light, and said third visual output includes illumination of both of said first and second indicator lights.

14. The electronic smoking device of claim 12, further comprising a user input in communication with said controller, said user input configured to receive at a first user input, a second user input, and a third user input, wherein said controller is further configured to illuminate said first indicator light in response to said user input receiving the first user input, illuminate said second indicator light in response to said user input receiving the second user input, and illuminate both of said first and second indicators light in response to said user input receiving the third user input.

15. The electronic smoking device of claim 14, wherein said user input comprises a singular button configured to receive the first, second, and third user inputs to toggle said device between one of respective first, second and third states.

* * * * *